S. P. BIRDSEY.
METHOD OF MAKING GRAPNELS.
APPLICATION FILED JUNE 17, 1919.
1,380,766.
Patented June 7, 1921.
2 SHEETS—SHEET 1.
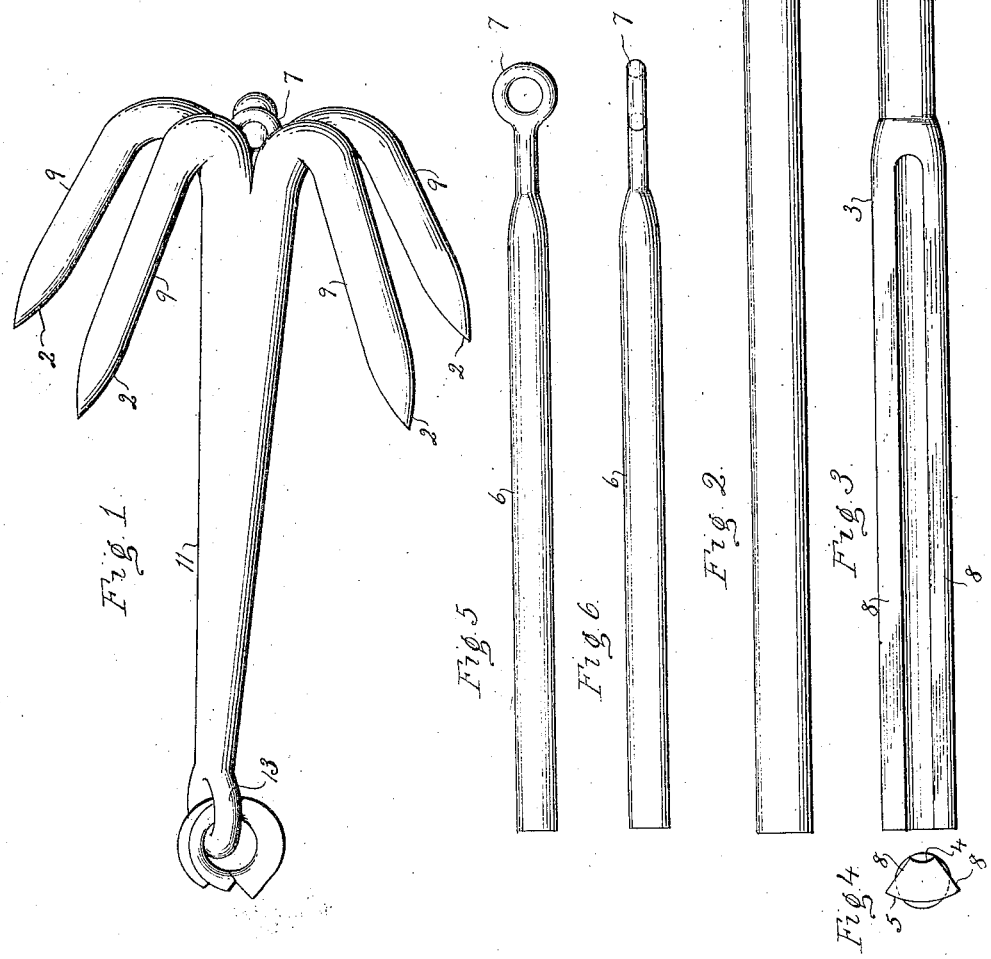

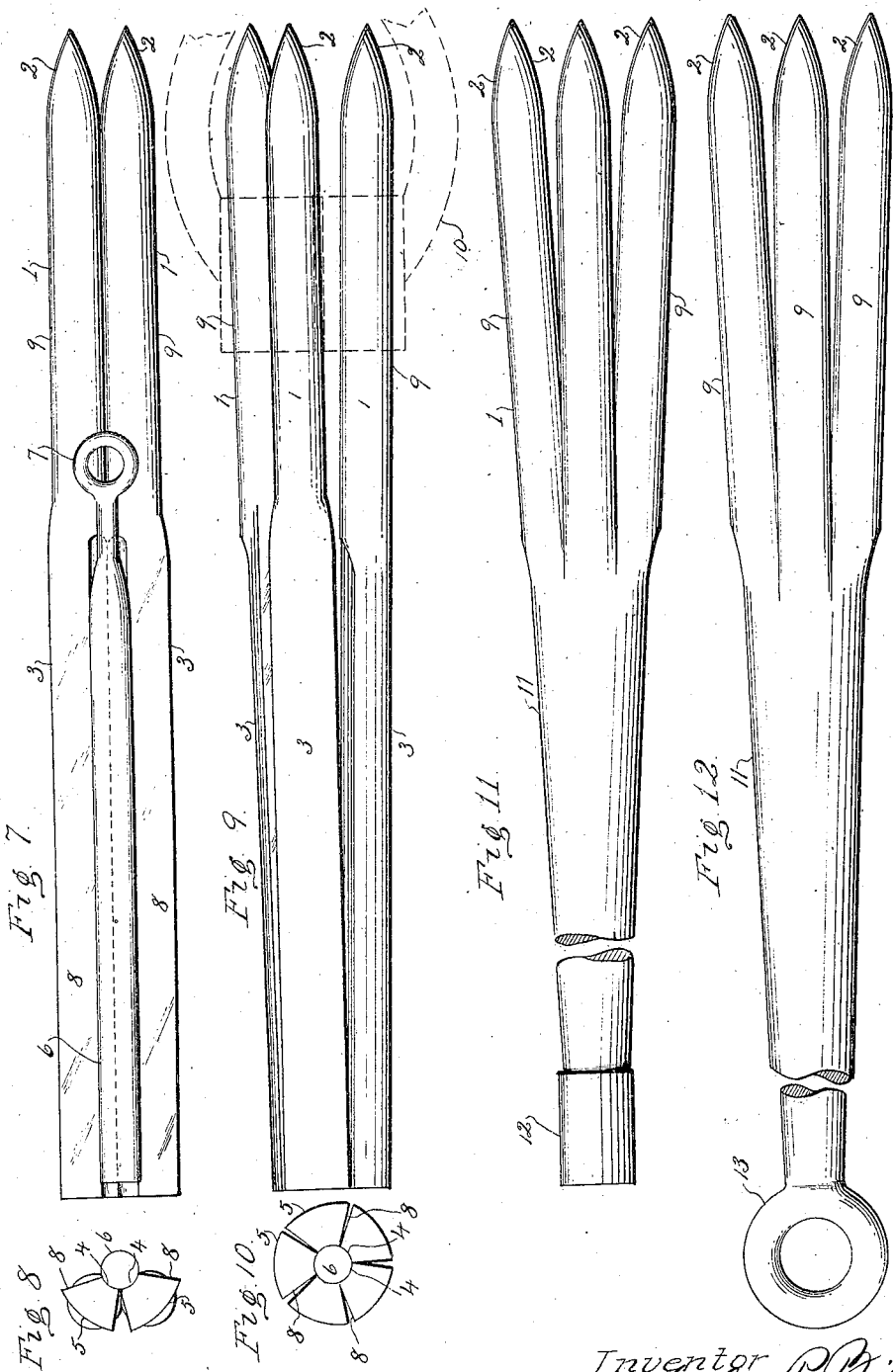

UNITED STATES PATENT OFFICE.

SEELEY P. BIRDSEY, OF MIDDLETOWN, CONNECTICUT, ASSIGNOR TO WILCOX, CRITTENDEN AND COMPANY, INC., OF MIDDLETOWN, CONNECTICUT, A CORPORATION OF CONNECTICUT.

METHOD OF MAKING GRAPNELS.

1,380,766.                  Specification of Letters Patent.      Patented June 7, 1921.

Application filed June 17, 1919.  Serial No. 304,800.

*To all whom it may concern:*

Be it known that I, SEELEY P. BIRDSEY, a citizen of the United States, residing at Middletown, in the county of Middlesex and State of Connecticut, have invented certain new and useful Improvements in Methods of Making Grapnels, of which the following is a specification, reference being had therein to the accompanying drawings.

My invention relates to grapnels and improved methods of making the same, having for its object, among other things, to produce a grapnel wherein each of the prongs thereon are an integral portion of the shank thereof, that will have the greatest possible strength, that can be manufactured with substantially perfectly welded joints and that will by reason of the arrangement and design so weld the several parts into a unitary structure whereby each of the original elements, or parts become an integral portion of the entire grapnel.

Having these and other ends in view my invention consists in the improved grapnel constructed by the new and improved method herein described, the several steps of which are illustrated in the drawings, wherein, Figure 1 is a perspective view of a grapnel manufactured by my improved method;

Fig. 2 is a view of one of the prongs after the pointing operation;

Fig. 3 is a view of the same prongs after its shank has been developed;

Fig. 4 is an end view of the prongs shown in Fig. 3;

Figs. 5 and 6 are elevations of the tripping eye and its shank;

Fig. 7 is a view of two of the prongs as shown in Fig. 3 with the tripping eye assembled therewith;

Fig. 8 is an end view of the parts shown in Fig. 7;

Fig. 9 is a view of all of the prongs assembled with the tripping eye ready for welding;

Fig. 10 is an end view thereof;

Fig. 11 is a view illustrating the prongs and tripping eye welded into a unitary structure; and Fig. 12 is a view of the grapnel ready for its first operation, that is, the bending of the prongs to produce the finished article as shown in Fig. 1.

Heretofore, grapnels have been made by first assembling a plurality of prongs, having a length substantially the same as that of the prong of the finished grapnel, then welding them together for a portion of their length; then secondly, forming the shank and finally, welding the shank upon the grouped prongs by either a butt or a scarf weld. In this method the prongs are grouped and welded with the stock cylindrical in cross section so that when assembled for welding, the exterior of one prong contacts with that of the adjacent prongs at only one point. Hence the entire cross-sectional shape of the prong must be broken down in the welding process so that when completed the cross section of all the prongs at the welding point is a single circle instead of a plurality of circles as before the welding process began. Therefore, a very substantial portion of the metal must be displaced, requiring great pressure which is applied to the exterior surfaces of the prongs. This results in the cooling of the surface of the prongs farthest from the group center before the nearer surfaces thereof, by reason of the contact of the cold tools therewith. In practice while the center of the weld is fairly perfect the exterior is highly imperfect, the joint being open and the weld instead of being complete from the center to the exterior is only complete for a portion of this depth. This original weakness of the prong welds is accentuated by the fact that these imperfect joints are difficult to galvanize or paint, hence the action of water in the joints is such that the rust begins to accumulate and in time eats away the joint to such an extent as to actually impair the usefulness of the grapnel. After this joint has been made it is necessary to bend the prongs outwardly which also has a tendency to further break open the already imperfect joints. Those can be repaired if discovered by further welding but frequently they are not discovered until the grapnel prong has been broken off by reason of its structural weakness.

The butt or scarf welding of the grapnel shank to the grouped prongs also produces a weak point and if the workmanship is not of the very best this joint is invariably so poorly produced as to make the use of a grapnel of this type almost prohibitive.

These and other objections to the prior art I have overcome in my new and improved method as will more particularly appear from the following description:

In the drawings, I have shown a five-prong grapnel but the method is equally adapted in the production of grapnels having a greater or less number of prongs. The initial step in my method is to provide a plurality of prongs 1, cylindrical in cross section, and pointed at 2, then upset the shank 3 thereof so that its shape in cross section is trapezoidal, the inner face 4 being of considerably less width than the outer face 5, both of these faces forming arcs of circles concentric with each other, and the radius of the arc of the inner face 4 being substantially the same as that of the shank 6 of the tripping eye 7 and the straight side faces 8 inclining toward each other as they approach the inner face. These latter faces are substantially radial in relation to the center of the shank of the tripping eye. That portion of the prong that retains its original cylindrical shape becomes the prong of the finished grapnel and is designated herein by reference numeral 9.

Each of the several prongs is constructed as above described and is assembled for welding with the tripping eye as shown in Figs. 7 to 10 inclusive, Figs. 7 and 8 illustrating two of the prongs assembled with adjacent faces 8 upon the prong shanks thereof substantially in contact with each other and the shank 6 of the tripping eye lying in the recess formed by the combined inner faces 4. When thus assembled the eye 7 is arranged relatively to the prongs so that it projects over the inner end of the portion 9. After two of the prongs and the tripping eye have been thus assembled the other three prongs are grouped around the tripping eye and held in these relative positions by a pair of tongs 10 illustrated by broken lines in Fig. 9. As so assembled, ready for welding, it will be noted that the shank 6 of the tripping eye is in the center of the grouped shanks 3, the inner faces of each of which contact with the exterior of the said shank 6 and that the open space between the side faces of the prongs 3 is extremely limited, in fact these side faces contact with adjacent side faces near the tripping eye and are only open a slight distance near the outer faces 5. When the parts are so assembled they are heated and subjected to pressure as is usual in welding metal and all of the prongs 3 and the shank 6 of the tripping eye 7 are welded into one common mass, the amount of metal to be displaced being reduced to the very minimum consisting only of such metal as is necessary to fill the limited open spaces between the faces 8 and even this may be limited by making the side faces 8 exactly radial with the center of the shank 6, but I prefer to leave a slight space such as shown. During the welding of the shanks of the prongs together the same are drawn out so as to elongate the shank 11 of the finished grapnel, and the end thereof forms the head 12 which is afterward shaped into the eye 13.

The prongs unified as herein described, the metal of the shanks thereof, as well as the shank of the tripping eye, are all united into one common mass and each become an integral portion of the shank 11 of the grapnel and the eye 13 at the end thereof. The quantity of metal displaced is so limited that the joints are practically completed at the first blow of the welding tools, hence eliminating the difficulty arising from the cooling of the exterior surfaces before the welding process is complete. Then by making the metal of the prongs of the finished grapnel also a part of the shank and the eye thereof there is no intermediate transverse joint to weaken the grapnel as in those made with a butt or scarf welded process as above described.

After the assembling and welding of the parts, as shown in Fig. 12, the prongs are bent outwardly to the desired angle, thus exposing the tripping eye 7 therebetween, which is now an integral part of the grapnel, and producing the finished product as shown in Fig. 1.

What I claim as new, and desire to secure by Letters Patent, is:

1. The herein described method of making grapnels, which consists in forming a series of bars each with a shank substantially trapezoidal in cross-section having opposite curved faces, then in arranging the bars with one end about a central shank having a substantially cylindrical cross-section with the inner curved faces of the bar shanks in contact therewith and with the opposite ends of the bars free and extending beyond the central shank, then in welding all of the parts together to form the shank of the finished grapnel and finally in bending said free ends of the bars to form prongs for the grapnel.

2. The herein described method of making grapnels which consists in welding one end of each of a series of bars in encircling relation about a central shank and leaving the opposite ends of the bars free to thereby form the shank of the finished grapnel, and then in shaping the free ends of the bars to form prongs for the grapnel.

3. The herein described method of making grapnels which consists in welding one end of each of a series of bars in encircling relation about a central shank and leaving the opposite ends of the bars free to thereby form the shank of the finished grapnel, and finally in forming an eye in one end of the finished shank and in shaping the free ends of the bars to form prongs for the grapnel.

4. The herein described method of making grapnels, which consists in welding one end of each of a series of bars in encircling relation about the shank of a tripping eye and leaving the opposite ends of the bars free thereby to form the finished shank of the grapnel, then in forming an eye in the end of the finished shank and finally in shaping the free ends of the bars to form prongs for the grapnel.

5. The herein described method of making grapnels, which consists in welding one end of each of a series of bars to a central shank and with the opposite ends of the bars free and extending beyond the shank, and then in shaping the said free ends of the bars to form prongs for the grapnel.

6. The herein described method of making grapnels, which consists in arranging a series of bars about and parallel to a central shank and with one end of each bar contacting with the shank and the opposite end free and extending beyond the shank, then in welding said bar ends to the shank to form the finished shank for the grapnel, and finally in shaping the said free ends of the bars to form prongs for the grapnel.

In testimony whereof I have hereunto affixed my signature.

SEELEY P. BIRDSEY.